Oct. 20, 1931.  W. L. BLACK  1,827,835
ANTIFRICTION GUIDE ROLLER
Filed April 28, 1928
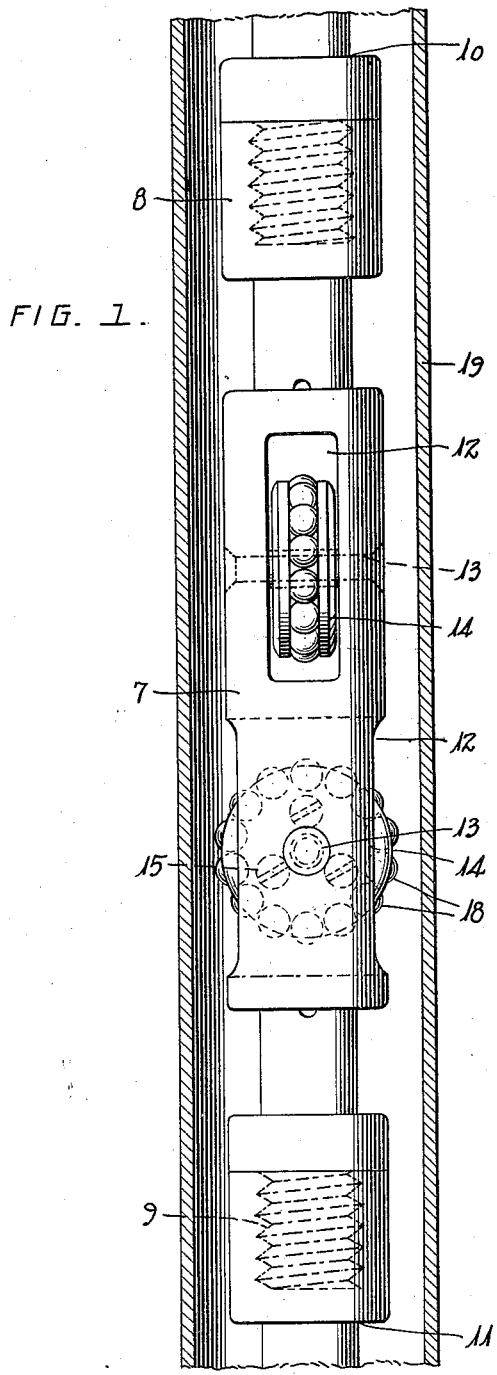
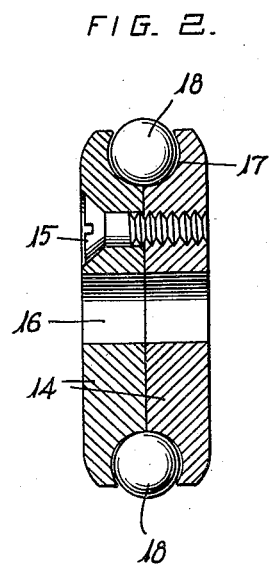
FIG. 1.
FIG. 2.
Inventor:
Wm L. Black
By Monroe E. Miller
Attorney.

Patented Oct. 20, 1931

1,827,835

UNITED STATES PATENT OFFICE

WILLIAM LESLIE BLACK, OF AUSTIN, TEXAS

ANTIFRICTION GUIDE ROLLER

Application filed April 28, 1928. Serial No. 273,601.

The present invention relates to guide rollers, such as are intended for sucker rods of deep wells, and the like, and it is an object of the invention to provide a roller which, if it binds or sticks so as to prevent rotation thereof, will still provide for anti-frictional contact with the well casing or other member along which the roller moves, so as to avoid cutting or chafing the casing or member.

Rollers of sucker rod guides not infrequently become stuck, due to sand or other foreign matter, thereby preventing the rollers from turning, and the rollers sliding along the well casing will result in objectionable wearing away of the casing. The improved roller is provided with means on its periphery providing for anti-frictional contact with the casing in the event that the roller refuses to rotate, thereby avoiding injury to the casing.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawings, wherein—

Figure 1 is a side elevation of a sucker rod coupler embodying two of the improved rollers, the well casing being shown in section.

Fig. 2 is a diametrical section of the improved roller, on an enlarged scale.

The roller may be used for guiding sucker rods and other reciprocatory members in various manners as known in the art, and may replace guide rollers already in use.

As shown, two of the rollers are mounted in a sucker rod coupler 7, which may be of the kind shown in my Patent No. 1,281,756, dated October 15, 1918, or which may be of any suitable kind. As shown, the coupler 7 has the threaded socket 8 and threaded stud 9 at its terminals to threadedly connect with the sucker rod sections 10 and 11, respectively. The coupler 7 has the slots or openings 12 extending diametrically therethrough at right angles to one another, to accommodate the rollers, and axles 13 are carried by the coupler and extend through said openings to support the rollers.

Each roller comprises the side plates or disks 14 secured together by screws 15, which are preferably countersunk, and said plates have the central opening to receive the axle 13, to mount the roller for rotation.

The periphery of the roller is formed with an annular circumferential groove 17 in which an annular series of anti-frictional balls 18 are disposed. The two halves of the groove 17 are formed in the confronting surfaces of the plates 14 and the balls are readily placed in said groove before the plates 14 are secured together. The groove, in cross section, extends through more than one-half of a circle, so as to hold the balls therein, although the balls protrude beyond the rim of the roller to contact with the well casing 19.

With the present roller, it may not only rotate about its axis, but if the roller refuses to turn, the balls 18 contacting with the casing 19 may roll around the roller, within the groove 17, thereby providing an anti-frictional contact between the roller and casing.

On account of the rotation of the roller and the rolling of the balls 18 in the groove 17, sand will not accumulate in the groove. Any particles of sand which enter the groove 17 will be worked toward the bottom of the roller and will drop out.

Having thus described the invention, what is claimed as new is:—

1. A sucker rod member intended to be reciprocated in a well casing, a roller carried for rotation by said member and projecting therefrom, and balls mounted for rolling movement on the periphery of the roller to contact with the well casing and carried bodily by said roller to move with or around the roller.

2. A sucker rod member intended to be reciprocated in a well casing, a roller carried for rotation by said member and projecting therefrom, said roller having a circumferential groove, and balls disposed in said groove for rolling motion around the roller and projecting beyond the periphery of the roller to contact with the well casing, said groove extending, in cross section, more than one-half of a circle to retain the balls therein.

3. A sucker rod member intended to be reciprocated in a well casing, a roller carried for rotation by said member and projecting therefrom, said roller comprising side plates having a circumferential groove between them extending, in cross section, more than one-half of a circle, and balls disposed in said groove for rolling motion around the roller and projecting beyond the periphery of the roller to contact with the well casing.

In testimony whereof I hereunto affix my signature.

WILLIAM LESLIE BLACK.